US011578191B2

(12) United States Patent
Posada Correa et al.

(10) Patent No.: US 11,578,191 B2
(45) Date of Patent: Feb. 14, 2023

(54) COMPOSITE CELLULOSE MATERIAL OBTAINED FROM COFFEE HUSKS OR COCOA SHELLS, AN ARTICLE COMPRISING SAME AND A METHOD FOR PRODUCING SAID MATERIAL

(71) Applicants: Industria Colombiana de Cafe S.A.S., Medellín (CO); Instituto Tecnológico Metropolitano, Medellín (CO)

(72) Inventors: Juan Carlos Posada Correa, Medellín (CO); Leyla Yamile Jaramillo Zapata, Medellín (CO); Juan Diego Ruiz Saldarriaga, Medellín (CO)

(73) Assignee: Industria Colombiana de Cafe S.A.S., Medellin (CO)

( * ) Notice: Subject to any disclaimer, the term of this patent is extended or adjusted under 35 U.S.C. 154(b) by 1091 days.

(21) Appl. No.: 16/311,853

(22) PCT Filed: Jun. 28, 2016

(86) PCT No.: PCT/IB2016/053837
§ 371 (c)(1),
(2) Date: Dec. 20, 2018

(87) PCT Pub. No.: WO2017/221055
PCT Pub. Date: Dec. 28, 2017

(65) Prior Publication Data
US 2019/0276636 A1    Sep. 12, 2019

(30) Foreign Application Priority Data
Jun. 20, 2016    (CO) .................................. 16160792

(51) Int. Cl.
*D21C 1/02* (2006.01)
*D21C 3/02* (2006.01)
(Continued)

(52) U.S. Cl.
CPC ................ *C08L 1/02* (2013.01); *B32B 23/04* (2013.01); *B32B 23/14* (2013.01); *D21C 1/02* (2013.01);
(Continued)

(58) Field of Classification Search
CPC ........... D21H 11/12; D21C 3/02; D21C 3/022
(Continued)

(56) References Cited

U.S. PATENT DOCUMENTS

| 3,686,384 A | 8/1972 | Runton |
| 3,927,235 A | 12/1975 | Chow |
| 2003/0213573 A1 | 11/2003 | Chen |

FOREIGN PATENT DOCUMENTS

| CN | 202115856 U | 1/2012 |
| CN | 102712409 A | 10/2012 |

(Continued)

OTHER PUBLICATIONS

Daud et al., Chemical Composition and Morphological of Cocoa Pod Husks and Cassava Peels for Pulp and Paper Production, 2013, Australian Journal of Basic and Applied Sciences, 7(9), 406-411. (Year: 2013).*

(Continued)

*Primary Examiner* — Anthony Calandra
(74) *Attorney, Agent, or Firm* — The Morales Law Firm; Joseph L. Morales, Esq.

(57) ABSTRACT

The present invention relates to the production of cellulose from coffee or cocoa husks. The cellulose extracted can be used to produce paper, card stock, and cardboard. In addition, a composite material also comprising a material that allows the release of aromas is manufactured using said cellulose. Said material is used to manufacture a laminated product for use in primary, secondary and tertiary packaging (Continued)

Figure 1:
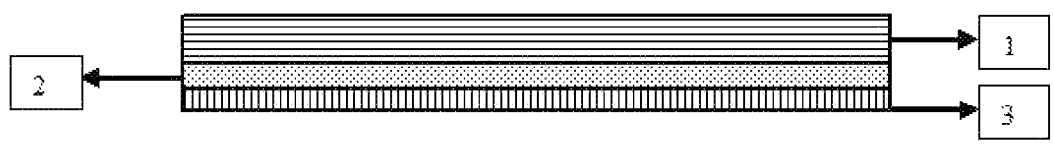

applications. Said type of article allows printing on the outer surface thereof, is biodegradable and biocompatible.

6 Claims, 1 Drawing Sheet

(51) Int. Cl.
*D21H 11/12* (2006.01)
*C08L 1/02* (2006.01)
*B32B 23/04* (2006.01)
*B32B 23/14* (2006.01)
*D21C 9/02* (2006.01)
*D21C 9/10* (2006.01)

(52) U.S. Cl.
CPC ............... *D21C 3/022* (2013.01); *D21C 9/02* (2013.01); *D21C 9/10* (2013.01); *D21H 11/12* (2013.01); *B32B 2307/7163* (2013.01); *B32B 2439/00* (2013.01)

(58) Field of Classification Search
USPC .......................................................... 162/99
See application file for complete search history.

(56) References Cited

FOREIGN PATENT DOCUMENTS

| | | |
|---|---|---|
| CN | 103054421 A | 4/2013 |
| CN | 103571166 A | 2/2014 |
| EP | 1818172 A4 | 5/2011 |
| GB | 2272903 A | 6/1994 |
| WO | 1999035049 A1 | 7/1999 |
| WO | 2014107767 A1 | 7/2014 |

OTHER PUBLICATIONS

Garcia-Muñoz A.F. et al. Extracción de celulosa a partir de la borra del café. Cenicafé 1999, vol. 50, N°3, pp. 205-2014. p. 2017.
Moya-Portugués, M. et al. Obtención de derivados celulósicos a partir de desechos de café. Agronomía Costarricense 1990, vol. 14, N° 2, pp. 169-174. Entire Document.

* cited by examiner

COMPOSITE CELLULOSE MATERIAL OBTAINED FROM COFFEE HUSKS OR COCOA SHELLS, AN ARTICLE COMPRISING SAME AND A METHOD FOR PRODUCING SAID MATERIAL

1. FIELD OF THE INVENTION

The present invention pertains to the technical field of materials obtained from cellulose. More specifically, the present invention discloses a cellulose composite material, obtained from the coffee or cocoa husks and the process to obtain the same. Additionally, the present invention discloses a laminated article comprised of said cellulose composite material, which also expels aromatic odors.

2. BACKGROUND OF THE INVENTION

Paper and cardboard are some of the most important packaging materials worldwide. In order to satisfy the growing demand for paper pulp and to preserve non-renewable wood resources, there is a great interest in the substitution of virgin raw material for obtaining different types of paper and cardboard. Moreover, there is a special interest towards raw materials and alternative cellulose pulp manufacturing processes, which generate lower environmental impacts, compared to the traditional raw materials and processes used.

As part of these alternative sources of cellulose pulp to obtain paper and cardboard, agricultural and agro-industrial waste have been used. Among these residues are sugarcane bagasse, rice husk, and recycled paper, among others. In particular, paper and cardboard obtained from these alternative raw materials are used in the production of packaging.

The manufacture of biodegradable materials for packaging has been reported in prior art, which are environmentally compatible and are produced from mixtures comprising recycled fibrous waste.

For example, US2003213573 (A1) proposes a container made from rice husk, wheat husk, wood powder, milk powder and clay, as a secondary food packaging. This container is formed from the agglomeration of the recycled material, which is fluidized, pressed, dried and coated with glue to obtain a waterproof and hygienic packaging material.

Patent CN103571166 (A) mentions a polypropylene carbonate (PPC) composite, cellulose or microcrystalline cellulose, a lubricating agent, an antioxidant, a heat stabilizer, a plasticizer and a biodegradation promoting agent. This document also proposes a preparation method of the composite material by extrusion granulation and subsequent hot pressing.

Furthermore, DE3937168 (A1) describes a material for food packaging based on cellulose, shells, bran, husk, barley beards, fibers, hop, finely ground straw, sawdust and animal-borne material, by-product of slaughterhouses. A waterproof coating is applied to the packaging surface. The packaging material contains 30-50% of a cellulose-type material and 30-70% of a starch and/or protein material, providing a biodegradable packaging material.

Patent CN102712409(A) describes the manufacture of reinforced biodegradable cardboard from starch and cellulose fibers stemming from recycled paper waste. This document discloses the use of a hard outer shell and a foamed interior, and a reinforcement achieved by means of a multilaminated or corrugated structure by means of an extrusion process.

However, a composite material manufactured from cellulose from coffee or cocoa husk, which can be used in packaging of food, medical materials, engineering plastics and the like, does not yet exist in prior art. Additionally, there is no material in prior art made from alternative sources of cellulose pulp, which has increased flexural strength compared to the flexural strength of widely used materials such as PPC.

Additionally, it is worth bearing in mind that in prior art, biodegradable articles have also been reported to be used in food packaging, which are manufactured with multiple layers or sheets. Some prior art documents referring to these types of inventions are mentioned below.

CN202115856 (U) discloses a disposable paper cup manufactured in layers. These layers are structured as follows: laminar polyurethane (inner layer), paper holding layer, a layer of printing ink and a surface layer of PE laminate. The surface layer of PE laminate is used to cover the printing ink layer, so the printing ink is isolated from the outside. Thus, a consumer is not in direct contact with the printing ink, when the disposable paper cup is used.

Furthermore, EP05781356A1 mentions a sheet comprised of several layers made from thermoplastic polyglycolic acid resin, laminated with aqueous adhesives with the possibility of using in packaging and food storage.

WO1999035049 describes a biodegradable disposable container, for food or medication, manufactured from bean, fiber and plant residues and a carboxymethyl cellulose, starch and water adhesive. These elements are mixed, pressed in a mold and dried to deposit a thin layer of wax on the surface of the container.

However, there is yet no laminated material for use in packaging, manufactured from cellulose obtained from coffee or cocoa husks in prior art.

In addition, other inventions previously reported in prior art are related to the release of aromatic odors, for example patent CN103054421(A). This document describes a capsule-type device, placed in the lower part of a disposable paper cup, which, upon contact with hot beverages is activated, allowing the diffusion of both aroma and tea flavor.

However, there is no product in prior art allowing the release of aromas of coffee or cocoa, that is additionally manufactured from cellulose from coffee or cocoa husks.

Thus, unlike prior art, the present invention relates to a composite material, manufactured from cellulose derived from coffee or cocoa husks, for the manufacture of a laminated article for the production of containers or packaging. Thus, the present invention provides an alternative source of cellulose pulp never used before, through which materials may be developed with improved flexural strengths, which allow the manufacture of composite sheets of cellulose from waste material for the subsequent preparation of packaging or containers, biodegradable and compostable, with controlled release of coffee and cocoa aroma.

3. GENERAL SPECIFICATION OF THE INVENTION

Coffee and cocoa husks are lignocellulosic materials of agro-industrial waste. These husks are an important source of cellulose fiber. The present invention uses this type of waste as an alternative raw material for the manufacture of cellulose pulp. This pulp can be used to obtain paper, paperboard and/or cardboard. Additionally, the invention discloses a composite material made from this cellulose pulp, which has an aroma release functionality. Furthermore, the present invention relates to a laminated article manufactured from the composite material, which can be used for the manufacture of packaging or containers. The composite material can be used in the manufacture of primary packaging, as well as in the manufacture of secondary and/or tertiary packaging.

The present invention also relates to the method that includes obtaining the cellulose pulp from coffee or cocoa husks (by the "kraft" method) and the subsequent addition of a material allowing the controlled release of aromas.

4. BRIEF DESCRIPTION OF THE FIGURES

FIG. 1—Illustrates the laminated article manufactured from the composite material obtained from coffee or cocoa husks.

Figure 2:
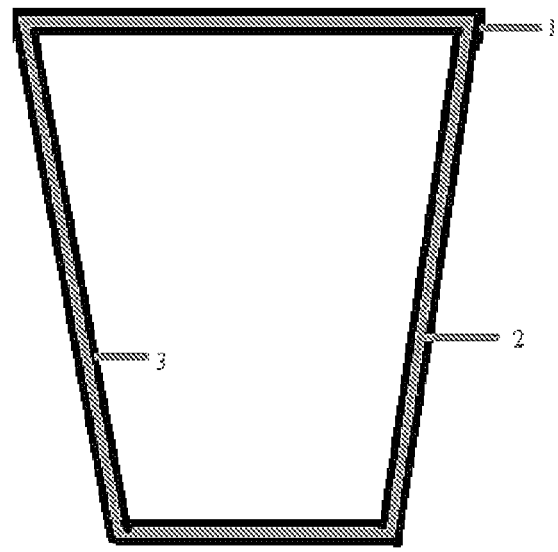

FIG. 2—Illustrates a container that can be made from the laminated article.

5. DETAILED DESCRIPTION OF THE INVENTION

First, the present invention relates to the extraction of cellulose from residues of coffee husks or cocoa husks. The production of cellulose can be carried out by means of a chemical process. This method consists of two phases, the first is to introduce the waste into a water-tight container where it is subjected to superheated steam at a pressure between 1500 to 2500 psi (10343 to 17237 kPa), for two hours to remove lignin and achieve an initial separation of the fibers. The second phase is to perform the cooking of the waste in a controlled pressure vessel between 1000 to 2000 psi (6895 to 13790 kPa), with a temperature between 200 to 250° C., in an alkaline solution based on sodium hydroxide (NaOH) and sodium sulfide ($Na_2S$). This process allows the extraction of the lignin present in the coffee and cocoa husks. Subsequently, a separation of sulfur-based gases and a filtrate is carried out to separate the non-degraded waste in the process. As a result of this process, a cellulose paste is obtained, which is classified, washed and bleached in different proportions. Finally, the paste obtained is dried.

The material that allows the controlled release of aromas is added to this cellulose paste. This mixture can be made by extrusion, mechanical mixing or in solution, generating the final composite material.

The material allowing the controlled release of aromas can be obtained by encapsulating a coffee or cocoa aromatic compound, which is carried out by dispersing the aromatic compound (active agent) in an encapsulating agent, among which there may be cashew gum, Arabic gum, mesquite gum, maltodextrin, chitosan. This dispersion is carried out by physical methods such as: spray drying, extrusion and spray coating. Also, chemical methods such as simple coacervation, complex coacervation and entrapment in liposomes may be used. It is also possible to use physical-chemical methods such as interfacial polymerization and molecular inclusion. The above allows controlling the volatility and reactivity of the active agent, increasing its stability to achieve a longer duration of the aroma in the composite material.

The composite material of the present invention may be used in the manufacture of primary, secondary and tertiary packaging.

Primary packaging means the packaging directly in contact with the product; it contains the product and also protects it. The primary packaging may cover the product entirely or only partially, but prevents the modification of the content without opening or modifying said container. Some examples of primary packaging are plastic bags, bottles, tetra-brick system, cans and jars among others. The primary packaging must contain fundamental data in which the name of the product, brand, weight, variety, manufacturer and country of origin are included. Moreover, the primary packaging must include the production date and the expiration date. Some products warn about their degree of toxicity, handling form and storage conditions. The primary packaging may also include a UPC, acronym of Universal Product Code or Universal Code of Products. In the field it is known as the Bar Code, which translates into a series of digits presenting information about the manufacturer and the product as such.

The secondary packaging is an external complement that groups several samples of primary packaging, its function is to safeguard it in quantities simplifying its distribution, storage and inventory. Inside the second level are cardboard boxes, crates, baskets, trays and boxes with holes (lugs), among others. These must contain the units neatly. The boxes must be duly marked indicating the number of units, their maximum resistance when stacking them, the product brand and its basic features.

The tertiary packaging or transport packaging is used in order to integrate uniform quantities of the product, already arranged into secondary packaging. The most used tertiary packages are hoppers, wired or nailed fences, pallets, baskets and containers among others. Within the large shipping containers are dividers or partitions of cardboard or plastic, in order to divide and secure the goods. The load is previously provided with reinforcements at the sides and at the ends, in order to increase its resistance to compression.

With the composite material, which comprises cellulose pulp obtained from coffee or cocoa husk and the material that allows the controlled release of aromas, it is possible to obtain a laminated article for the manufacture of primary, secondary or tertiary packaging. This laminate article has three layers made of composite material and is illustrated in FIG. 1. The difference between the layers lies in the percentage by weight of biodegradable biopolymer with cellulosic material (amount of cellulose pulp) comprising the composite from each one of the layers is manufactured. The union of the different layers is obtained by passing the different layers by rollers at a controlled pressure, speed and temperature. This lamination can be done by incorporating adhesives, which may be dry or in emulsion, or by thermal methods where heat is applied to seal the different layers.

Next, the features of each one of the layers comprising the laminated article are related:

External layer (1), which comprises up to 100% by weight of biodegradable biopolymer with cellulose material obtained from coffee or cocoa husk. This high content of biodegradable biopolymer from the coffee or cocoa husk allows printing on the outer layer.

Intermediate layer (2), comprising between 5% and 10% by weight of biodegradable biopolymer with cellulose material obtained from coffee or cocoa husk. This intermediate layer has mechanical stability.

Internal layer (3), which comprises between 2% and 5% by weight of biodegradable biopolymer with cellulose material obtained from coffee or cocoa husk. This layer acts as a barrier to liquids, it is safe to allow contact with beverages and food.

In a preferred embodiment of the invention, the outer layer (1) of the laminated article comprises up to 100% by weight of biodegradable biopolymer with cellulosic material obtained from coffee or cocoa husk.

Thus, the laminated article allows the printing of information about the packaging, which is very important in its commercial application, as explained above. In addition, by comprising high proportions of biodegradable components (cellulose obtained from coffee or cocoa husk), the article may be composted after use, reducing the solid waste associated with this type of packaging, whether primary, secondary or tertiary. Additionally, this item may release aromas.

The composite material has an improved flexural strength. Particularly, the flexural strength of the composite material in the present invention increases between 2 to 38 times compared to the flexural strength of the PPC. It also has a density between 0.4 and 0.8 g/cm$^3$, a tension index between 300 to 600 Nm/g, a tear index with a range of 200 to 300 mNm$^2$/g, explosion rate and order performance 40 to 60%.

The lignocellulosic material obtained from the coffee and cocoa husks under the previously described process may also be used to obtain paper, paperboard and cardboard. The difference between these products lies in the weight. The paper has a weight of up to 130 g/m$^2$, the paperboard a weight between 130 to 240 g/m$^2$ and the cardboard weighing more than 240 g/m$^2$.

EXAMPLES

Example 1—the Manufacture of a Vessel Made from the Laminated Article of the Present Invention A vessel (primary packing) was obtained, with aroma release, comprised of the laminated article obtained from cellulose of coffee or cocoa husks. This vessel is illustrated in FIG. 2. It has (1) external layer, (2) intermediate layer, (3) internal layer, having a density between 18 and 250 g/m$^2$, and a caliber of 180 Um. Its specific properties are reported below:

| References | 2 Ounces | 4 Ounces | 7 Ounces | 10 Ounces | 12 Ounces | 16 Ounces |
|---|---|---|---|---|---|---|
| Dimensions | 52 × 49 × 36 mm | 61 × 51 × 50 mm | 70 × 76 × 50 mm | 79 × 97 × 50 mm | 76 × 118 × 51 mm | 88 × 125 × 61 mm |
| Material | | | Coffee husk or cocoa husk | | | |
| Finish | | | Rustic | | | |
| Density (grammage) | | | 18-250 g/m$^2$ | | | |
| Caliber | | | 180 Um | | | |
| Virgin Pulp | | | 100% | | | |
| Recycling | | | 0 | | | |
| Print | | | Possibility of printing | | | |
| Recyclable material | | | 100% | | | |
| Biodegradable material | | | 100% | | | |

Example 2—Manufacture of Paperboard, Cardboard and Corrugated Cardboard of the Present Invention Using the method of the present invention, under the compression process, applying a controlled pressure and temperature, a material formed by several overlapped layers is obtained of the biodegradable and compostable material, with a density of 100 and 800 g/m$^2$ onwards, from which paperboard, cardboard and corrugated cardboard are obtained.

The invention claimed is:

1. A method for obtaining a cellulose composite material from coffee or cocoa husks, comprising the steps of:
   a) subjecting coffee or cocoa husk residues to superheated steam;
   b) cooking the coffee or cocoa husk residues in an alkaline solution comprising sodium hydroxide (NaOH) and sodium sulphide (Na$_2$S), obtaining a cellulose paste and non-degraded residues;
   c) separating the non-degraded residues from the cellulose paste;
   d) screening, washing, bleaching and drying the cellulose paste separated in step c);
   e) obtaining a material that allows the controlled release of aromas;
   f) mixing the material that allows the controlled release of aromas with the cellulose paste resulting from step d).

2. The method of claim 1, wherein step a) is carried out at a gauge pressure between 10,343 and 17,237 kPa for 2 hours.

3. The method of claim 1, wherein step b) is carried out at a gauge pressure between 6,895 and 13,790 kPa and at a temperature between 200 to 250° C.

4. The method of claim 1, wherein obtaining a material allowing the controlled release of aromas in step e) is carried out by dispersing the aromatic compound of coffee or cocoa in an encapsulating agent, by mechanical or chemical methods.

5. A laminated article comprising an external layer, an intermediate layer and an internal layer said layers are made from the cellulose composite material obtained by the method of claim 1, wherein:
   external layer comprises between 70% and 100% by weight of the cellulose composite material;
   the intermediate layer comprises between 5% and 10% by weight of the cellulose composite material;

and the internal layer, comprises between 2% and 5% by weight of the cellulose composite material.

6. The laminated article of claim 5, wherein the external layer comprises between 70% and 90% by weight of cellulosic composite material.

\* \* \* \* \*